(12) United States Patent
Saylor

(10) Patent No.: US 6,340,104 B1
(45) Date of Patent: Jan. 22, 2002

(54) AUTOMOBILE WINDOW COAT HANGER WITH SUCTION CUPS

(76) Inventor: Mike Saylor, 320 Parkway Dr., St. Marys, OH (US) 45885

( * ) Notice: Subject to any disclaimer, the term of this patent is extended or adjusted under 35 U.S.C. 154(b) by 0 days.

(21) Appl. No.: 09/630,670

(22) Filed: Aug. 1, 2000

(51) Int. Cl.⁷ .............................................. A47G 25/14
(52) U.S. Cl. .......................................... 223/94; 223/85
(58) Field of Search .............................. 223/94, 89, 85, 223/92, 88

(56) References Cited

U.S. PATENT DOCUMENTS

| 851,527 | A | * | 4/1907 | Kronacher | 223/94 |
| D128,287 | S | * | 7/1941 | Lauronen | 224/927 |
| 3,708,093 | A | * | 1/1973 | Toms, II | 223/42.45 A |
| 4,813,640 | A | * | 3/1989 | Perentin | 248/205.8 |
| 5,137,158 | A | * | 8/1992 | Brockaway | 211/87 |
| 5,480,076 | A | * | 1/1996 | Siegel | 223/94 |
| 5,687,888 | A | * | 11/1997 | Chang | 223/94 |

FOREIGN PATENT DOCUMENTS

| FR | 629628 | * 11/1927 | 223/94 |

* cited by examiner

Primary Examiner—Bibhu Mohanty
(74) Attorney, Agent, or Firm—Michael L. Wright

(57) ABSTRACT

A compact portable hanger which can be attached to the windows of automobiles is described. The body of the hanger is attached to a connection section which has one or more suctions cups. The suctions cups of allow the hanger to be reversibly affixed to an automobile window. The connection section will space the hanger from the window to allow an article of clothing to freely hang.

6 Claims, 3 Drawing Sheets

AUTOMOBILE WINDOW COAT HANGER WITH SUCTION CUPS

FIELD OF THE INVENTION

Figure 1:
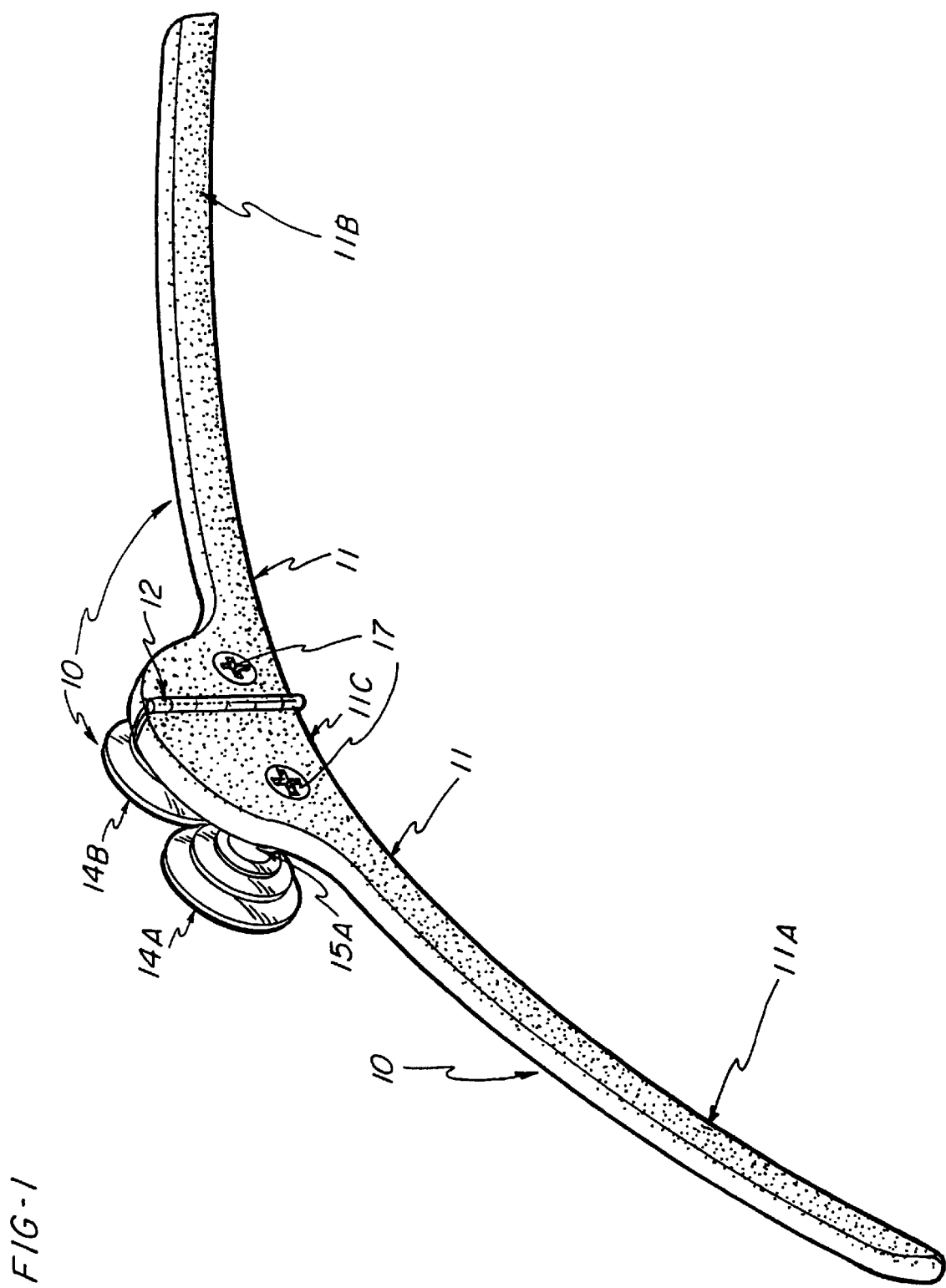

The present invention relates to hangers for articles of clothing. The hanger of the present invention has suction cups attached to allow the hanger to be readily attached to smooth surfaces such as automobile windows.

BACKGROUND OF THE INVENTION

Contemporary American business practice requires that persons who desire to project a professional and competent look must wear wrinkle free clothing. In fact, many professionals, particularly salesman, often spend hours at a time, in their automobiles. Wearing articles of clothing, such as a suit jacket, while traveling in an automobile can cause the jacket to wrinkle. These facts suggest that a person may wish to remove his jacket when in an automobile.

It is possible to use anyone of the several types of hangers which are commercially available. However, not every car has a hook or other means to attach the hanger. In other cases these hangers are too flimsy or bulky to carry conveniently in a briefcase. The hanger of the present invention is sturdy and can be folded to be conveniently carried in a brief case. Additionally, the present design will not hinder the function of an automobiles window.

Another appealing feature of the present garment hanger verses a conventional hanger is that while traveling, conventional hangers are not secured, creating vibrational noise and creates a potentially dangerous environment. Whereas, the present hanger does not vibrate nor expose a driver or passenger to danger. Also, the present garment hanger, unlike the conventional hangers has an area in front of the connector section in which advertisements can be affixed. This feature allows for the affixing of labels, logos, insignia or any other commercially appealing advertisement.

Hangers and other means of temporarily securing clothing in an automobile is well-known. Various commercial products are available. In addition, the prior art teaches the need for devices to facilitate the temporary storage of clothing in automobiles. Briefly, U.S. Pat. No. 3,708,093 teaches that an elongated telescoping rod could be supported by the automobile "hook." This telescoping rod is further supported and anchored by a suction cup. This patent is clearly designed to support a number of conventional hangers. A functionally comparable device for hanging clothing in an automobile is U.S. Pat. No. 4,778,089. This patent teaches the use of grooved telescoping tubes to hold the hangers in place and teaches the use of a specially designed support to place on an automobile hook. Additionally, U.S. Pat. No. 4,632,255 teaches the uses of a telescoping tube which folds and whose housing is attached to smooth surfaces such as bathrooms tile by means of suction cups.

The aforementioned patents do not teach the use of one or more suctions cups to be affixed to a hanger, such that the hanger can be directly attached to an automobile window. This feature is clearly desirable because a person may use several different automobiles, such as rentals, during the course of their daily business routine. As a result, a person would need a hanger that would be useful in more than one vehicle. For example, if one were driving a convertible top automobile, there may not be a means to hang the rod. The present invention requires only a window surface.

DETAILED DESCRIPTION OF THE INVENTION

FIG. 1 is a perspective view of the present invention. The compact portable coat hanger 10 comprises a contour shape 11 with two wings, 11A and 11B, and a central part 11C. It is to be noted that contour shapes are common shapes for hangers. Variations of contour shapes are well known to commerce. The wings 11A and 11B are affixed to each other with a hinge 12 which is in the middle of the central part 11C. Attached to the contour shape are suction cups 14A and 14B. Suction cups, 14A and 14B are spaced from the contour shape form by means of connector sections 15A and 15B. (15B not shown in FIG. 1) 17 shows the cap end of screw with standard heads. The screws affix the suction cups to the contour shape through the connector sections 15A and 15B. The present invention teaches the use of suction cups, from 1 to perhaps 4 or 5 could be used. Likewise, FIG. 1 shows a single hinge. The present invention teaches that central part 11C could be used with a hinge attaching wing 11A and a second hinge could be used to attach wing 11B to central section 11C. In addition, a hinge 12 is not required to make the present invention, the contour shape 11 could be one continuous piece.

Figure 2:
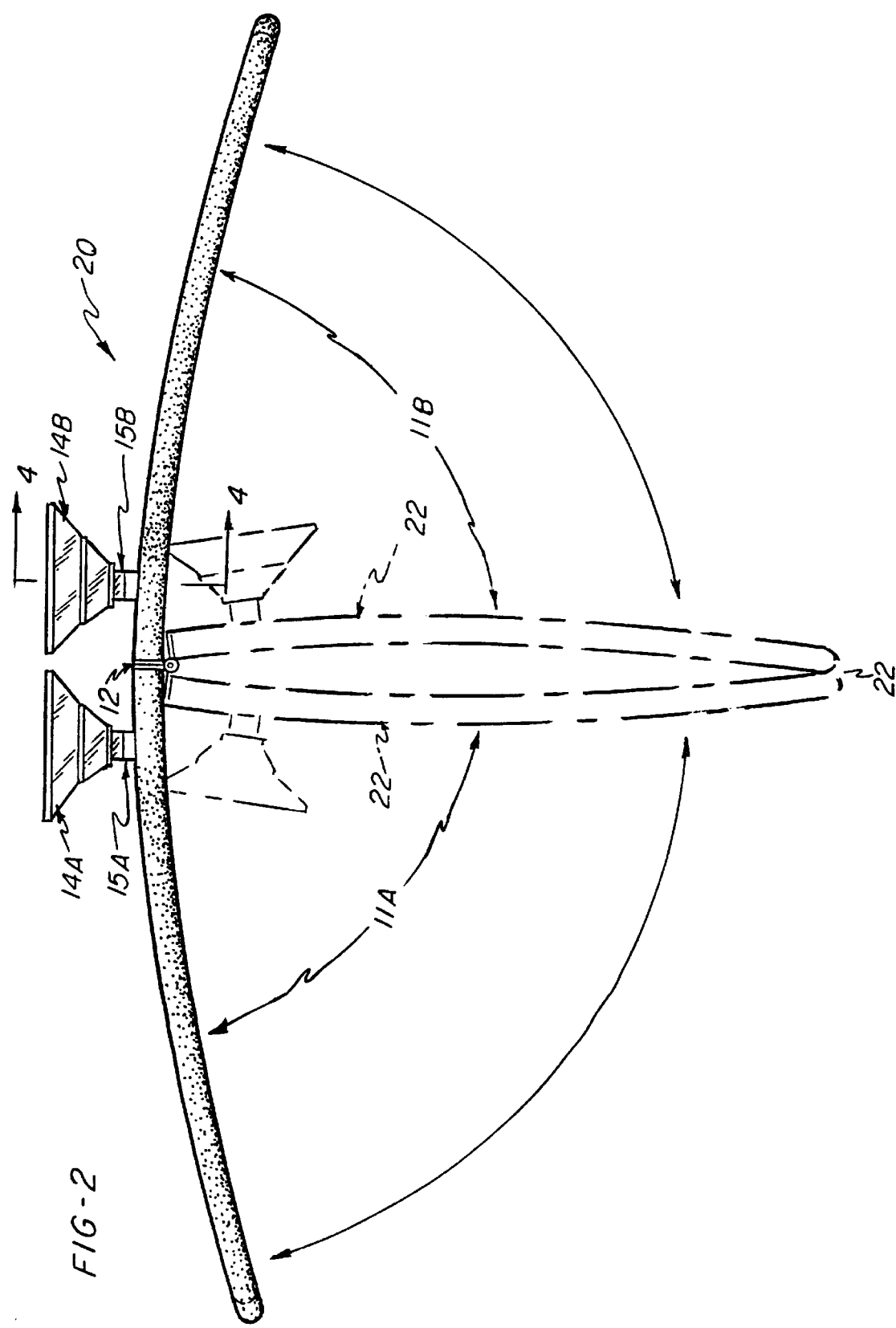

FIG. 2 illustrates a top view of the compact portable coat hanger. In the present embodiment the angle between the two wings is approximately 180 deg. As a practical matter any angle of between 180 deg. and 150 deg. would be acceptable. Wing 11A and wing 11B are shown in the solid view 20, which shows the wings 11A and 11B extended. The outlined view 22 shows a top view of the compact portable coat hanger 10 in a folded compact position. Wings 11A and 11B fold with hinge 12 to become proximate with each other. Likewise "4" shows a cross section through the suction cup 14B to illustrate a means of attaching the suction cups through the connector section 15B to the contour shape form 11.

Figure 3:
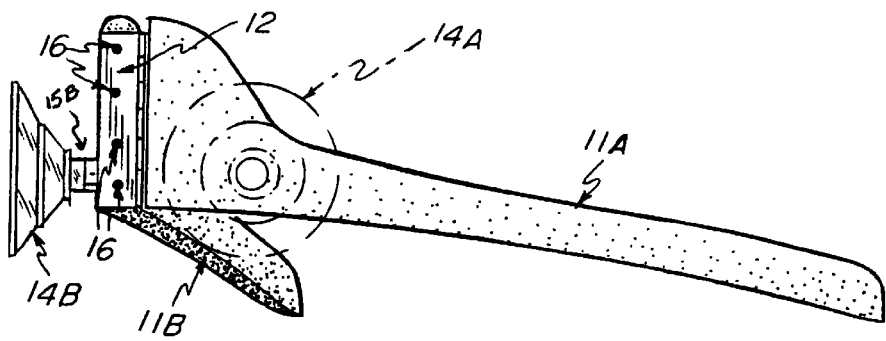

FIG. 3 illustrates the hinge 12 which allows the halves of the contour shape form to be folded with hinge 12 to be proximal with each other. The series of dots 16 shown in one half of the hinge 12 are either nails or screws. Other means such as adhesives could be used to attach the hinge 12 to the two halves 11A and 11B of the contour shape form 11. Suction cup 14A is shown in outline because it is out of plane in this illustration. Connector section 15B is shown as a spacer which places the hanger at a distance from the place of attachment, i.e. the smooth surface of an automobile window.

Figure 4:
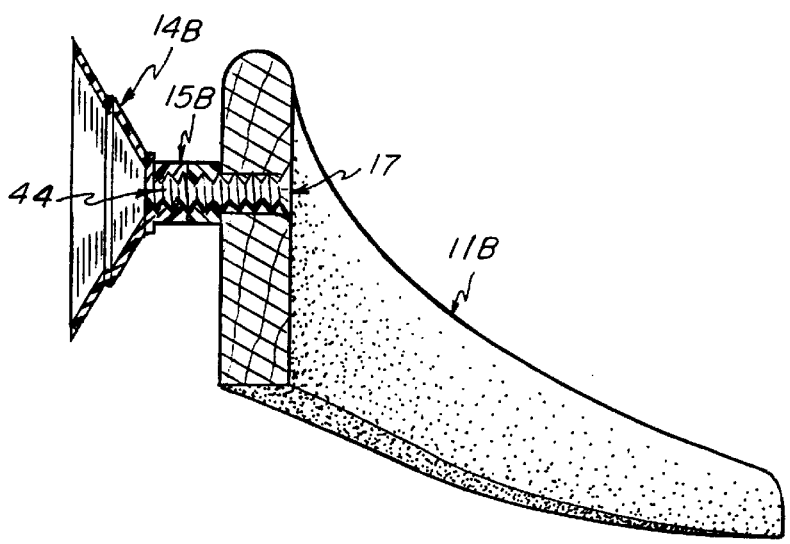

FIG. 4 shows a cut through section. This figure illustrates a means of attaching the suction cup 14B with contour shape form 11. Screw 44 is turned through connector section 15B and attaches the center of the suction cup 14B to the contour shape form 11. The means of affixing the suction cup 14B to the hanger could be with a second type of hinge on connector section 15B. The second type of hinge could affix the connector section to the body of the contour shape form 11. Such second type of hinges would allow the present invention to be folded into a more compact unit.

I claim:

1. A hanger for an article of clothing which can be reversibly affixed to a smooth surface such as an automobile window comprising:

a generally contour shape form;

said contour shape form has a central section and two wings;

and one or more suction cups are affixed to said central section wherein said central section of said hanger has a single hinge at the midpoint of said central section.

2. A hanger for an article of clothing as recited in claim 1 wherein said wings of said hanger are on a verticle plane at an angle between 150 and 180 degrees.

3. A hanger for an article of clothing which can be reversibly affixed to a smooth surface such as an automobile window comprising:

a generally contour shape form;

said contour shape form has a central section and a first wing and a second wing;

said first wing and said second wing are each attached to said central portion with a hinge.

and one or more suction cups are affixed to said central section.

4. A hanger for an article of clothing as recited in claim 3 wherein said wings of said contour shaped form have a vertical plane angle between 150 and 180 degrees.

5. A hanger for an article of clothing as recited in claim 1 wherein each of said suction cups are spaced from said central section with a connector section.

6. A hanger for an article of clothing as recited in claim 3 wherein each of said suction cups are spaced from said central section with a connector section.

* * * * *